United States Patent

Sacks

[11] Patent Number: 6,022,820
[45] Date of Patent: Feb. 8, 2000

[54] SILICON CARBIDE FIBERS WITH LOW BORON CONTENT

[75] Inventor: Michael D. Sacks, Gainesville, Fla.

[73] Assignee: University of Florida, Gainesville, Fla.

[21] Appl. No.: 09/082,945

[22] Filed: May 21, 1998

Related U.S. Application Data

[60] Provisional application No. 60/055,423, Aug. 4, 1997.

[51] Int. Cl.⁷ .......................... C04B 35/565; C04B 35/52
[52] U.S. Cl. .......................... 501/95.1; 501/88; 501/96.3; 423/345; 264/DIG. 19
[58] Field of Search .......................... 501/88, 95.1, 96.3

[56] References Cited

U.S. PATENT DOCUMENTS

| | | | |
|---|---|---|---|
| 4,346,049 | 8/1982 | Coppola et al. | 264/65 |
| 4,579,704 | 4/1986 | Tanaka et al. | 264/65 |
| 5,063,107 | 11/1991 | Birchall et al. | 428/367 |
| 5,162,269 | 11/1992 | Deleeuw et al. | 501/88 |
| 5,167,881 | 12/1992 | Atwell et al. | 264/22 |
| 5,268,336 | 12/1993 | Deleeuw et al. | 501/88 |
| 5,283,044 | 2/1994 | Okamura et al. | 423/345 |
| 5,322,822 | 6/1994 | Seguchi et al. | 501/88 |
| 5,354,527 | 10/1994 | Frechette et al. | 264/63 |
| 5,366,943 | 11/1994 | Lipowitz et al. | 501/88 |
| 5,676,918 | 10/1997 | Okada et al. | 423/346 |
| 5,707,568 | 1/1998 | Deleeuw et al. | 501/88 |
| 5,792,416 | 8/1998 | Sacks et al. | 264/625 |
| 5,851,942 | 12/1998 | Sacks et al. | 501/95.1 |
| 5,863,848 | 1/1999 | Bujalski et al. | 501/88 |

FOREIGN PATENT DOCUMENTS

| | | |
|---|---|---|
| 834485 | 4/1998 | European Pat. Off. |
| 11061573 | of 0000 | Japan. |
| 401009871 | 1/1989 | Japan. |

*Primary Examiner*—Paul Marcantoni
*Attorney, Agent, or Firm*—Thomas C. Saitta

[57] ABSTRACT

Silicon carbide (SiC) fibers, or SiC bodies such as coatings, thin films, substrates or bulk objects, which have been sintered with boron containing additives to promote densification and pore removal, are further treated to remove a substantial amount of the residual boron from the SiC fibers. The SiC fibers, subsequent to the sintering steps and either before or after cooling, are exposed to a carbon monoxide (CO) containing atmosphere at elevated temperatures from approximately 1600–2200° C., but more preferably from approximately 1700–2000° C., with treatment times ranging from seconds to hours to days depending on the chosen treatment temperature. The resulting SiC fibers show a significant reduction of residual boron content, a reduction of greater than 90% in some cases, while retaining high tensile strength. Fibers with less than 0.1 wt % residual boron have been obtained.

29 Claims, No Drawings

SILICON CARBIDE FIBERS WITH LOW BORON CONTENT

This application claims the benefit of U.S. Provisional Application No. 60/055,423, filed Aug. 4, 1997.

This invention was made with Government support under grant/contract no. MDA972-92-2-0007 awarded by the Defense Advanced Research Projects Agency. The Government has certain rights in the invention.

BACKGROUND OF THE INVENTION

This invention concerns a method for producing high-strength, thermally-stable, silicon carbide (SiC) fibers with low boron contents. The method is also applicable to the fabrication of other SiC ceramics, such as SiC coatings, thin substrates, porous ceramics, etc., with low boron content. In general, the invention relates to treatment of the SiC fibers after sintering to remove residual boron, and in particular relates to exposing the SiC fibers to an atmosphere of CO gas under elevated temperature.

Silicon carbide (SiC) is a material with excellent mechanical properties at high temperatures. In order to obtain high strength, it is important to produce SiC ceramics with high relative density (i.e., low residual porosity) and fine grain sizes. However, it is difficult to prepare pure SiC with high relative density and fine grain sizes by sintering methods, especially by pressureless sintering methods. In samples comprised of fine particles or fine crystallites, pure SiC generally undergoes coarsening or growth of crystallites and pores during high temperature heat treatment because of the dominance of surface diffusion and/or vapor phase diffusion processes. Thus, very little densification from pore removal occurs in pure SiC during high temperature heat treatment. As a result of this problem, sintering aids are used to enhance densification and to prevent coarsening during sintering and thereby allow the fabrication of SiC with high relative density and fine grain sizes. Several additives have been found effective as sintering aids for SiC, but boron-containing compounds are the most commonly used additives. Varying amounts of boron compounds have been reported as effective for sintering (e.g., 0.2–5 wt %), but boron concentrations on the order of approximately 0.5–1 wt % are most common.

Despite the benefit of using boron in order to produce dense, fine-grained SiC fibers and other SiC bodies, the presence of boron in SiC may have an adverse effect on some properties of SiC. For example, boron reduces the resistance to high temperature creep (i.e., relatively slow deformation under load) which may limit the utility of the SiC ceramics for applications requiring long use times under fixed loads at high temperatures, such as in engine applications. H. M. Yun, J. C. Goldsby, G. N. Morscher, and J. A. DiCarlo showed, in Paper 54 in the Proceedings of the Annual HITEMP Review 1995, NASA Conference Publication 10178, 1995, that SiC fibers with lower boron contents had better high temperature creep resistance. Studies with bulk SiC samples also indicate that boron has an adverse effect on creep resistance. The presence of boron in SiC may also have an adverse effect on other SiC properties, such as the stability and mechanical properties of SiC ceramics that are exposed to nuclear irradiation.

This invention describes a general method for the fabrication of SiC fibers, preferably with dimension of less than 50 microns, with low boron content. Alternatively, the method can be used to reduce the concentration of boron that may be present in pre-existing SiC fibers. The method allows the fabrication of fibers with boron contents less than 0.1% and tensile strengths of 2.0 GPa or greater.

The method can also be applied to other SiC carbide ceramics, such as SiC coatings, thin substrates, etc. It could also be applicable to porous bulk SiC ceramics composed of a particulate or fiber framework. In general, the method can be used to prepare SiC ceramics with low boron content or can be used to reduce the boron content in pre-existing SiC ceramics.

There are many methods of forming SiC ceramics. SiC ceramics are often prepared by forming and consolidating fine SiC particles into a desired shape and subsequently heat treating to sinter the "green" shape in order to eliminate the interparticle pores or void spaces and to obtain a strong body with high relative density and little or no residual porosity. SiC ceramics are also prepared by other methods, especially by chemical vapor deposition (CVD) and by heat treatment of organosilicon polymers. For example, organosilicon polymers have been used to prepare fine SiC particles, fibers, bulk samples, coatings, etc. Some samples prepared using organosilicon polymers develop fine SiC crystallites and fine pores during processing and, hence, a sintering step is required to produce a dense SiC sample.

The typical sintering temperatures for preparing dense SiC are in the range of approximately 1700–2300° C. The required temperature is highly dependent upon the size of the SiC particles or crystallites which comprise the porous body that is being sintered. For example, SiC bodies fabricated from the more conventional powder processing routes generally require higher sintering temperatures in the range of approximately 1900–2300° C. and this results in sintered bodies comprised of coarser grain sizes (greater than 1 micron). In contrast, organosilicon polymer-derived SiC bodies can be sintered at lower temperatures (e.g., from approximately 1700–1900° C.) and, consequently, the resulting grain sizes are usually smaller (less than 1 micron).

One of the earliest uses of boron sintering additives was for processing SiC shapes by hot pressing or pressureless sintering of SiC powders. Prochazka in U.S. Pat. Nos. 3,853,566, 3,960,577, 3,954,483, 3,968,194, and 4,004,934 reported that small amounts of boron, especially when combined with small amounts of carbon, could be used to enhance densification and produce SiC bulk samples with high densities and fine grain sizes. Boron was incorporated by mixing SiC powders with boron-containing powders such as elemental boron, boron carbide, and boron nitride. It was also reported that gaseous boron trichloride could be used to vapor-phase dope boron directly into SiC powders during their synthesis by CVD methods. The minimum amount of boron needed for good densification was approximately 0.3 wt %, although higher amounts were generally used. Because Prochazka used powder processing methods, sintering and hot pressing temperatures were generally in the range of approximately 1900–2100° C., with the lower temperatures in this range being used for samples which were hot pressed. The boron-doped SiC bodies were sintered to high relative density using several different gas atmospheres, including argon, helium, nitrogen, and vacuum.

Numerous other studies have confirmed the benefit of using boron or boron-containing compounds as sintering aids in powder processing of SiC with high relative density and fine grain sizes. The minimum required concentration of boron are reported to be at least 0.2–0.3 wt %, but for practical application the amounts of boron needed are usually in the range of from approximately 0.5–1.0 wt % or higher.

Powder processing methods can be used to form SiC fibers, especially fibers with larger diameter (i.e., greater than 25 microns). Frechette et al. in U.S. Pat. No. 4,908,340 and in Ceram. Eng. Sci. Proc. 12[7–8]992–1006, 1991 (by F. Frechette, B. Dover, V. Venkateswaran, and J. Kim) prepared SiC fibers by either melt spinning or dry spinning of mixtures of SiC particles and organic polymers. Boron was incorporated in the fibers by adding 0.2–1.0 wt % boron carbide powders to the spinning mixtures. Some fibers were heat treated in crucibles which had been coated with slurries containing boron carbide in order to form boron-containing gases during the sintering operation. SiC fibers were sintered at temperatures in the range of 1900–2150° C. in an argon atmosphere or at 2300° C. in a nitrogen atmosphere in order to obtain substantially dense, low porosity, fibers. It is reported in U.S. Pat. Nos. 4,004,934 and 4,908,340 and elsewhere that higher sintering temperatures are required for densification when nitrogen is used as the sintering atmosphere.

Bolt et al. in U.S. Pat. No. 4,942,011 prepared SiC fibers by spinning mixtures of SiC particles and organosilicon polymers. One of the sintering aids used was boron carbide. The concentration of the sintering aids was 0.2–5% based on the SiC weight. Fibers were heat treated at temperatures in the range of 1900–2000° C. in an argon atmosphere.

Birchall and Clegg in U.S. Pat. No. 5,063,107 prepared SiC fibers in a similar manner to Frechette et al. and Bolt et al. They used mixtures of SiC particles and organic polymers. They also utilized known sintering aids, such as boron. Sintering was carried out at 2040° C. for 20 minutes in an argon atmosphere.

The use of boron in gaseous form for enhancing densification of SiC was clearly demonstrated by Smoak in U.S. Pat. No. 4,237,085. SiC green compacts were initially prepared from fine SiC particles without incorporating any boron source within the compact. The green compacts were then sintered at high temperature in an atmosphere which contained boron gases. The boron gases were formed by putting volatile boron sources (e.g., boron trichloride, elemental boron, or boron carbide) in the sintering furnace. These sources formed boron-containing vapors during the high temperature sintering treatment. The diffusion and infiltration of the boron gases into the green compacts allowed densification to proceed so that high sintered densities were achieved.

Boron-doped SiC bodies with high relative density have also been formed using mixtures of SiC particles and borosiloxane polymers. This was demonstrated by Burns et al. in U.S. Pat. No. 5,112,779 using sintering temperatures in the range of 2000–2200° C. to achieve densification. Suitable atmospheres for sintering were argon, helium, nitrogen, and vacuum.

The beneficial effect of using boron doping to form strong, dense SiC has also been demonstrated in other methods of preparation of SiC, including preparation methods using CVD and organosilicon polymers. It has been shown that SiC fibers prepared by CVD can be doped with boron by a vapor phase method. D. E. Elkins, G. M. Mallon, and H. Shimizu, in "Modified Silicon-Carbide Continuous Filaments," D-41-D-49, 10th National Symposium, SAMPE, San Diego, Calif., November, 1966 discovered that gaseous boron halides could be used to incorporate varying amounts of boron into SiC fibers. The boron additions resulted in fibers with smoother surfaces, finer grains sizes, and higher tensile strengths.

Organosilicon polymers are the preferred material for forming SiC fibers with fine diameters of less than approximately 25 microns. Yajima et al. in U.S. Pat. Nos. 4,052,430, 4,100,233, 4,220,600, and 4,283,376 developed processes for preparing polycarbosilane polymers and SiC-based fibers from polycarbosilane polymers. The processes developed by Yajima et al. are the basis for NICALON™ fibers which are manufactured by Nippon Carbon Co., Ltd. A similar commercial process involves using a titanium metal-modified polycarbosilane (i.e., a polytitanocarbosilane) polymer and is the basis for TYRANNO™ fibers which are manufactured by Ube Industries Ltd. Yajima et al., in some of the earlier cited patents and in U.S. Pat. No. 4,152,509, also reported that SiC fibers could be prepared from poly carbosilane polymers which were synthesized from a polysilane and a phenyl-containing polyborosiloxane. A typical method for synthesis of the boron-containing polymers (i.e., phenyl-containing polyborosiloxane polymers) involved reacting boric acid with a diphenylchlorosilane, although other reactants were also reported. The organosilicon polymer fibers produced by the various methods of Yajima et al. were pyrolytically decomposed to SiC-based fibers by heat treatment at temperatures usually less than 1300° C. Pyrolysis was usually carried out in nitrogen or argon atmospheres or under vacuum. The fibers produced by these methods do not have good thermomechanical stability. The fibers degrade extensively and become extremely weak when heat treated at temperatures above approximately 1200–1400° C. This is because of carbothermal reduction reactions that occur as a result of large amounts of oxygen and excess carbon in the SiC fibers.

Other methods have been reported for introducing boron into organosilicon polymers and using such polymers to prepare SiC-based fibers. Takamizawa et al. in U.S. Pat. No. 4,604,367 prepared SiC-based fibers which contained boron by using organoborosilicon polymers. These polymers were prepared by reacting an organopolysilane with an organoborazine compound, such as B-trimethyl-N-triphenyl borazine, B-trivinyl-N-triphenyl borazine, and B-triamino-N-triphenyl borazine. The organoborosilicon polymers were melt spun into green fibers which were infusibilized by oxidative or irradiative cross-linking methods and subsequently pyrolyzed to form SiC-based fiber containing boron and nitrogen. Takamizawa et al. indicated that heat treatments could be carried out in vacuum or inert gas atmospheres at temperatures up to 1800° C., although the preferred heat treatment temperatures were less than 1600° C. The resulting fibers showed better strength retention upon high temperature heat treatments compared to NICALON™ fibers, but the fibers still started to show decreased strengths after heat treatments at temperatures above approximately 1100–1200° C. and the strengths were too low for the fibers to be useful at temperatures above approximately 1500° C.–1600° C.

Researchers at Dow Corning have reported in U.S. Pat. Nos. 5,071,600, 5,162,269, 5,167,881, 5,268,336, 5,279,780 and 5,366,943 the fabrication of boron-doped, low-oxygen-content SiC fibers with carbon-rich or near-stoichiometric composition which were prepared based on using several organosilicon polymers (i.e., polycarbosilane, methylpolydisilylazane, polyorganosiloxane). In U.S. Pat. Nos. 5,071,600 and 5,162,269, for example, fibers were formed by melt spinning of low-molecular-weight polycarbosilane. Fibers were oxidatively cured to prevent melting of the fibers during subsequent heat treatment. The primary modification of the process of Yajima et al. was to incorporate sufficient amounts of boron (greater than 0.2 wt %) in the fibers so that high relative density and fine grain sizes could be obtained after sintering. The patents describe mostly gas-phase doping methods in which it was indicated that boron-containing compounds (e.g., diborane, boron trifluoride, boron tribromide, boron trichloride, tetraborane, pentaborane, borazine, trichloroborazine) could be infiltrated into the fibers at temperatures in which the compounds were in the form of gases. The boron-containing gas could be introduced at various stages in the fiber fabrication process, but it must be present prior to the onset of sintering in order to prevent grain coarsening and to allow densification of the porous SiC fibers to occur. The fibers develop fine pores after a high temperature pyrolysis process which typically occurs in the range of approximately 1200–1600° C. The porosity is removed by sintering at a temperature typically in the range of 1800–1850° C. in an argon atmosphere. In addition to gas phase doping, the Dow Corning patents also describe instances in which the organosilicon polymer can be synthesized such that it contains some boron. The fibers produced according to the methods described in the Dow Corning patents had much better thermomechanical stability compared to some other organosilicon polymer-derived fibers, such as the NICALON™ and TYRANNO™ fibers. According to Lipowitz et al. (in Ceram. Eng. Sci. Proc., 16[4]55–62, 1994), the fibers retained 96% of their original tensile strength after heat treatment at 1550° C. for 10 hours in an argon atmosphere. The fibers retained 74% of their original tensile strength after heat treatment at 1800° C. for 12 hours in an argon atmosphere. The fibers produced according to the Dow Corning patents are known as SYLRAMIC™ fibers.

Sacks et al. in pending U.S. patent application Ser. No. 08/683,475 reported the fabrication of boron-doped, low-oxygen-content SiC fibers with near-stoichiometric composition, high relative density, and high tensile strength which were prepared using high-molecular-weight polycarbosilane polymers. Fibers were sintered in an argon atmosphere. In most examples, the fibers were sintered in the range of 1750–1800° C. for 1 hour. If fibers were sintered at higher temperatures, shorter sintering times were used to produce fibers with high relative density and high strength. For example, sintering times were 12 and 2 minutes when sintering temperatures were 1845 and 1890° C., respectively. The fibers typically retained more than 90% of the original tensile strength after being re-heated in an argon atmosphere at 1800° C. for 4 hours and approximately 75% of the original strength after heat treatment in argon at 1950° C. for 1 hour.

SUMMARY OF THE INVENTION

Silicon carbide (SiC) fibers, or SiC bodies such as coatings, thin films or thin substrates, which have been sintered with boron containing additives to promote densification and pore removal, are further treated to remove a substantial amount of the residual boron from the SiC fibers. The SiC fibers, subsequent to the sintering steps and either before or after cooling, are exposed to a carbon monoxide (CO) containing atmosphere at elevated temperatures from approximately 1600–2200° C., but more preferably from approximately 1700–2000° C., with treatment times ranging from seconds to hours to days depending on the chosen treatment temperature. The resulting SiC fibers show a significant reduction of residual boron content, a reduction of greater than 90% in some cases, while retaining the high tensile strength. Fibers with less than 0.1 wt % residual boron have been obtained.

DETAILED DESCRIPTION OF THE INVENTION

The invention will now be described in detail with regard for the best mode and the preferred embodiments. The methodology of the invention is applicable to any SiC bodies, such as thin films, coatings or substrates, but in particular the methodology is highly applicable to improving the properties of SiC fibers, and as such the methodology will be mostly described below in reference to treatment of SiC fibers for purposes of clarity.

SiC fibers with relatively low boron content may be prepared using any of the known processes. The initial processing steps for preparing the SiC fibers used in the examples cited in this application were the same as in U.S. Pat. No. 5,792,416, issued Aug. 11, 1998 to Sacks et al. and U.S. Pat. No. 5,851,942, issued Dec. 22, 1998 to Sacks et al. incorporated herein by reference. This includes the following steps: (i) Polycarbosilane (PCS) polymer is synthesized by pressure pyrolysis of polydimethylsilane (PDMS). The average molecular weight for the PCS is typically in the range of approximately 7,000–16,000. (ii) A concentrated fiber-spinning solution or spin dope is prepared using PCS, one or more solvents (e.g., toluene), one of more spinning aids (e.g., polysiloxane (PSO), polysilazane (PSZ)), and a boron-containing sintering aid (e.g., solid boron hydride). The typical range of polymer concentrations are from approximately 60 to 75% and the typical spin dope viscosities are in the range of approximately 10 to 100 Pa.s. (iii) Fibers are formed by extruding the spin dope through a spinneret and collecting the extruded filaments on a winding wheel. (iv) The green, as-collected, fibers are heat treated using oxidizing and non-oxidizing atmospheres to accomplish removal of solvent and incorporation of oxygen (at less than about 300° C.), pyrolytic decomposition of the organosilicon polymer (at less than about 1200° C.), carbothermic reduction reactions which remove excess carbon and oxygen (at less than about 1650° C.), and sintering to densify the fiber (at less than about 2000° C.). In the last of these initial processing steps, the fibers are heat treated in an inert gas atmosphere, such as in argon gas, in order to produce a fiber with high relative density (i.e., low residual porosity).

In the present invention, an additional processing step is used to reduce the residual boron content in the fibers. Specifically, the sintered fibers are heat treated in a carbon monoxide (CO) gas-containing atmosphere. The purpose of this step is remove boron which was originally incorporated in the fiber during spin dope preparation as a sintering aid to allow the fibers to sinter to high density with fine grain size.

It is believed that carbon monoxide in the heat treatment atmosphere reacts with boron at the SiC surface according to a reaction such as:

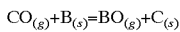

Boron oxides are volatile at the temperatures used in the heat treatment and, hence, boron would be eliminated from the SiC fiber surface through the above or similar reactions as a gaseous species. The elimination of boron from the SiC fiber surface would create a boron concentration gradient from the fiber interior to the fiber surface. Hence, diffusion of boron from the fiber interior to the fiber surface would be expected. The boron diffusing to the surface would also be eliminated at the surface by reaction with CO present in the atmosphere. Hence, most of the boron can be eliminated from the SiC fibers if an atmosphere containing CO is maintained and if the boron diffusion from the interior to the surface of the fibers is sufficiently rapid. Rapid diffusion of boron can be obtained by using sufficiently high heat treatment temperatures in order to increase the diffusion coefficient for boron in SiC. However, it would be expected that the strength of the SiC could be degraded due to grain growth if the heat treatment temperature is too high (i.e., substantially higher than the normal sintering temperature). However, it was unexpectedly discovered in this invention that boron diffusion is still sufficiently fast at moderate temperatures such that most of the boron can be eliminated from samples. The boron removal can occur efficiently if at least one dimension in the sample is relatively thin. The moderate processing temperature allows high strength to be maintained in the resulting SiC ceramic.

This invention may be practiced such that all the heat treatments can be carried out together as part of a combined process for fabricating the fibers, i.e., it is not necessary to remove the fibers from the furnace each time the heat treatment involves a different gas atmosphere and/or temperature. The atmospheres and temperatures in the furnace can simply be changed in a sequential fashion during one continuous furnace run. Alternatively, the heat treatments can be carried out on pre-existing SiC fibers. Hence, the method can be applied to improve the properties of pre-existing fibers such as SYLRAMIC™ fibers produced by Dow Corning Corp. or any other appropriate commercially-produced or developmental SiC fiber.

The removal of residual boron is accomplished by elevating or maintaining the boron-containing SiC fibers to a temperature range of between approximately 1600–2200° C., with a more preferable treatment range of between approximately 1700–2000° C., and a most preferable range of between approximately 1700–1900° C. Treatment at the lower temperatures would require impractically long treatment time periods of days and months to accomplish significant boron removal, while treatment at the higher temperatures would require only minutes or seconds or less. The particular treatment temperature and time chosen should also factor in any other changes in microstructure which may affect the properties of the SiC fibers, such as grain growth. Grain growth often results in a reduction in strength, but an increase in creep resistance. The heat treatment time and temperature may also depend on whether the fibers are processed in a continuous or a batch mode. Faster treatment times are usually desirable for continuous rather then batch processing of the SiC fibers. As shown in the examples, treatment in CO atmosphere at approximately 1800° C. for 30 minutes reduced boron content in SiC fibers from approximately 0.79 wt % to approximately 0. 15 wt %, while treatment at approximately 1700° C. for 3 hours reduced boron content to approximately 0.19 wt % and treatment at approximately 1700° C. for 12 hours reduced boron content to approximately 0.10 wt %. In contrast, treatment at approximately 1800° C. for 3 hours reduced boron content to approximately 0.077 wt %, illustrating that shorter reaction times can be used when the treatment temperature is higher.

The gas atmosphere for boron removal is preferably inert and preferably comprises a IS significant percentage of CO, even up to 100% CO. An atmosphere of 15% CO and 85% argon has found to be suitable and produces reasonable reaction times, and it would be possible to reduce the CO concentration even further if a reduction in reaction time was not detrimental. The boron removal can be performed at one atmosphere or under varying pressure to alter the reaction rate.

Examples illustrating the above method are given below for SiC fibers produced using the initial processing steps given above. However, it must be emphasized that the method of reducing boron contents in SiC discovered in this invention is by no means limited to the SiC fibers prepared by dry spinning of high-molecular-weight polycarbosilane-based polymers. It is evident that the process can be applied to other SiC fiber fabrication processes, including polymer-derived fiber fabrication processes based on melt spinning, wet spinning, or dry spinning of other organosilicon pre-ceramic polymers. The process can also be applied to SiC fibers prepared by fabrication methods based on powder processing and vapor-phase processing. Furthermore, as long as at least one of the three dimensions of a SiC object is small enough, it would be possible to remove most of the boron from other SiC ceramics (e.g., bulk samples, substrates, coatings, etc.) using the heat treatment method described in this invention. In order to accomplish the boron removal in a reasonable time, it is believed that the SiC object should have at least one dimension that is smaller than several hundred micrometers, and preferably less than approximately 50 micrometers. Otherwise, the time to remove the boron may be too long for practical application. The SiC objects could have two dimensions that are small, such as fibers, or one dimension that is small, such as SiC coatings, SiC substrates, etc. In addition, it would be possible to remove boron from SiC objects in which three-dimensions were large if the SiC body had open and connected porosity. A porous body of this type would allow the CO-containing gas to penetrate into and throughout the body. This would allow the boron-removing reaction shown above to occur at the internal solid surfaces and, hence, boron would be removed from the body. It would only be necessary for the SiC skeletal structure comprising the three-dimensional body to have local thicknesses in the range of several hundred micrometers or less.

EXAMPLES

Example 1

SiC fibers were initially prepared according to the procedures in U.S. Pat. Nos. 5,792,416 and 5,851,942. The boron-containing fibers prepared according to this method were sintered to a maximum temperature of 1840° C. for 12 minutes in an argon atmosphere. The fibers were then heat treated at 1800° C. for 30 minutes in an atmosphere with approximate composition of 15% carbon monoxide (CO)/85% argon. After this heat treatment, the fibers had a boron content of approximately 0.15 wt %, as determined by neutron activation analysis (NAA). For comparison, SiC fibers were prepared following the same procedure as described above, except there was no heat treatment step with the CO-containing atmosphere. These fibers had a boron content which was more than five times higher, i.e., approximately 0.79 wt %, as determined by NAA.

The SiC fibers produced with low boron content by the methods in this example had high strength. The fiber tensile strengths were determined using American Society for Testing and Measurements (ASTM) procedure D3379. The average tensile strength was approximately 2.3 GPa and the average fiber diameter was approximately 11.5 microns.

The fibers which had been prepared with the aforementioned heat treatment at 1800° C. for 30 minutes in the CO-containing atmosphere were subsequently heat treated again for an additional 2.5 hrs at 1800° C. in the approximately 15% carbon monoxide (CO)/85% argon atmosphere. After this heat treatment, the boron content in the fibers had decreased to only approximately 0.077 wt % as determined by NAA, i.e., less than 10% of the original boron content in the fiber before any heat treatment in the CO-containing atmosphere. The average tensile strength of the fibers was 2.0 GPa and the average fiber diameter was approximately 11.5 microns.

Example 2

Fibers were initially prepared according to the procedures in U.S. Pat. Nos. 5,792,416 and 5,851,942. The boron-containing fibers prepared according to this method were sintered to a maximum temperature of 1840° C. for 12 minutes in an argon atmosphere. The fibers were then heat treated at 1700° C. for 3 hours in an atmosphere with approximate composition of 15% carbon monoxide (CO)/85% argon. After this heat treatment, the fibers had a boron content of approximately 0.19 wt %, as determined by NAA. The average tensile strength of the fibers was approximately 2.3 GPa and the average fiber diameter was approximately 10.5 microns.

Another set of fibers was initially heat treated in argon to a maximum temperature of 1840° C. for 12 minutes and then subsequently heat treated in a carbon monoxide-containing atmosphere (approximately 15% CO/85% argon) at 1700° C. for 12 hr. After heat treatment, the fibers had a boron content of approximately 0.10 wt % as determined by neutron activation analysis. The average tensile strength of the fibers was approximately 2.2 GPa and the average fiber diameter was approximately 10.5 µm.

It is understood that certain equivalents and substitutions to elements set forth above may he obvious to those skilled in the art, and the true scope and definition of the invention therefore is to be as set forth in the following claims.

I claim:

1. A post-densification process for reducing the boron content of densified silicon carbide fibers, said fibers having been produced by a process chosen from the group of processes consisting of sintering, vapor-phase deposition and heat treatment of organosilicon polymers, comprising the steps of providing densified silicon carbide fibers containing residual boron, said boron having been originally incorporated in the fibers as a densification aid, and subsequently, at a temperature within the range of approximately 1600 to 2200° C. to promote diffusion of the boron to the surface of the fibers, exposing the densified fibers to an atmosphere consisting essentially of inert gas and up to 100 percent carbon monoxide gas in an amount sufficient to react with and remove the boron which has diffused to the surface of the densified fibers, for a period of time sufficient to reduce the amount of boron in the densified fibers.

2. The process of claim 1, where said temperature is within the range of approximately 1700 to 2000° C.

3. The process of claim 1, where said temperature is within the range of approximately 1700 to 1900° C.

4. The process of claim 1, where said atmosphere comprises approximately at least 15% carbon monoxide.

5. The process of claim 1, where said period of time is sufficient to reduce the amount of boron in the fibers by greater than 90 percent.

6. The process of claim 1, where said period of time is sufficient to reduce the amount of boron in the fibers to below 0.2 wt % where said densified fibers have greater than 0.2 wt % residual boron when initially exposed to said atmosphere consisting essentially of inert gas and up to 100 percent carbon monoxide gas at a temperature within the range of approximately 1600 to 2200° C.

7. The process of claim 1, where said period of time is sufficient to reduce the amount of boron in the fibers to below 0.1 wt % where said densified fibers have greater than 0.1 wt % residual boron when initially exposed to said atmosphere consisting essentially of inert gas and up to 100 percent carbon monoxide gas at a temperature within the range of approximately 1600 to 2200° C.

8. A post-densification process for reducing the boron content of densified silicon carbide bodies, said bodies having been produced by a process chosen from the group of processes consisting of sintering, vapor-phase deposition and heat treatment of organosilicon polymers, comprising the steps of providing densified silicon carbide bodies containing residual boron, said boron having been originally incorporated in the bodies as a densification aid, and subsequently, at a temperature within the range of approximately 1600 to 2200° C. to promote diffusion of the boron to the surface of the bodies, exposing the densified bodies to an atmosphere consisting essentially of inert gas and up to 100 percent carbon monoxide gas in an amount sufficient to react with and remove the boron which has diffused to the surface of the densified bodies, for a period of time sufficient to reduce the amount of boron in the densified bodies.

9. The process of claim 8, where said temperature is within the range of approximately 1700 to 2000° C.

10. The process of claim 8, where said temperature is within the range of approximately 1700 to 1900° C.

11. The process of claim 8, where said atmosphere comprises approximately at least 15% carbon monoxide.

12. The process of claim 8, where said period of time is sufficient to reduce the amount of boron in the bodies by greater than 90 percent.

13. A process for reducing the boron content of densified silicon carbide fibers, comprising the steps of densifying green silicon carbide fibers containing boron added as a densification aid to produce sintered silicon carbide fibers containing residual boron, subsequently, at a temperature within the range of approximately 1600 to 2200° C. to promote diffusion of the boron to the surface of the densified fibers, exposing the densified fibers to an atmosphere consisting essentially of inert gas and up to 100 percent carbon monoxide gas in an amount sufficient to react with and remove the boron which has diffused to the surface of the densified fibers, for a period of time sufficient to reduce the amount of boron in the densified fibers.

14. The process of claim 13, where said temperature is within the range of approximately 1700 to 1900° C.

15. The process of claim 14, where said atmosphere comprises approximately at least 15% carbon monoxide.

16. A high purity, silicon carbide fiber consisting essentially of carbon and silicon in near-stoichiometric ratio and residual boron, said residual boron present in an amount less than 0.10 wt %, having a tensile strength of at least about 2.0 GPa, a density of at least about 3.0 g/cm$^3$, and which retains greater than 90% of the original tensile strength after treatment at 1800° C. for 4 hours.

17. The fiber of claim 16, produced by the process of providing densified silicon carbide fibers containing residual boron, added to the fibers as the primary densification aid, in an amount equal to at least 0.10 wt %, exposing said fibers, at a temperature within the range of approximately 1600 to 2200° C. to promote diffusion of the boron to the surface of the fibers, to an atmosphere consisting essentially of inert gas and up to 100 percent carbon monoxide gas in an amount sufficient to react with and remove the boron which has diffused to the surface of the fibers, for a period of time sufficient to reduce the amount of boron in the fibers to less than 0.10 wt %.

18. The fiber of claim 16, produced by the process of providing densified silicon carbide fibers containing residual boron, added to the fibers as the primary densification aid, in an amount equal to at least 0.20 wt %, exposing said fibers, at a temperature within the range of approximately 1600 to 2200° C. to promote diffusion of the boron to the surface of the fibers, to an atmosphere consisting essentially of inert gas and up to 100 percent carbon monoxide gas in an amount sufficient to react with and remove the boron which has diffused to the surface of the fibers, for a period of time sufficient to reduce the amount of boron in the fibers to less than 0.10 wt %.

19. The fiber of claim 17, where the amount of residual boron is reduced by greater than 90 percent.

20. The process of claim 1, where said step of exposing said densified fibers to an atmosphere consisting essentially of inert gas and up to 100 percent carbon monoxide gas at a temperature within the range of approximately 1600 to 2200° C. is performed immediately after said fibers are densified.

21. The process of claim 1, where said step of exposing said densified fibers to an atmosphere consisting essentially of inert gas and up to 100 percent carbon monoxide gas at a temperature within the range of approximately 1600 to 2200° C. is performed after said densified fibers have cooled.

22. The process of claim 8, where said step of exposing said densified bodies to an atmosphere consisting essentially of inert gas and up to 100 percent carbon monoxide gas at a temperature within the range of approximately 1600 to 2200° C. is performed immediately after said bodies are densified.

23. The process of claim 8, where said step of exposing said densified bodies to an atmosphere consisting essentially of inert gas and up to 100 percent carbon monoxide gas at a temperature within the range of approximately 1600 to 2200° C. is performed after said densified bodies have cooled.

24. The process of claim 13, where said step of exposing said densified fibers to an atmosphere consisting essentially of inert gas and up to 100 percent carbon monoxide gas at a temperature within the range of approximately 1600 to 2200° C. is performed immediately after said fibers are densified.

25. The process of claim 13, where said step of exposing said densified fibers to an atmosphere consisting essentially of inert gas and up to 100 percent carbon monoxide gas at a temperature within the range of approximately 1600 to 2200° C. is performed after said densified fibers have cooled.

26. The process of claim 13, where said boron is added as a densification aid in an amount such that greater than about 0.20 wt % remains in said densified fibers after said densification step is completed, and where said residual boron is reduced to an amount less than 0.20 wt % upon exposing said densified fibers to an atmosphere consisting essentially of inert gas and up to 100 percent carbon monoxide gas at a temperature within the range of approximately 1600 to 2200° C.

27. The process of claim 13, where said boron is added as a densification aid in an amount such that greater than about 0.10 wt % remains in said densified fibers after said densification step is completed, and where said residual boron is reduced to an amount less than 0.10 wt % upon exposing said densified fibers to an atmosphere consisting essentially of inert gas and up to 100 percent carbon monoxide gas at a temperature within the range of approximately 1600 to 2200° C.

28. The process of claim 13, where said period of time is sufficient to reduce the amount of boron in the fibers by greater than 90 percent.

29. The fiber of claim 18, where the amount of residual boron is reduced by greater than 90 percent.

* * * * *